(12) United States Patent
Patrick

(10) Patent No.: US 7,136,849 B2
(45) Date of Patent: Nov. 14, 2006

(54) METHOD SYSTEMS AND COMPUTER PROGRAM PRODUCTS FOR INDICATING LINKS TO EXTERNAL URLS

(75) Inventor: Kyle Nathan Patrick, Maple Ridge (CA)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 10/487,971

(22) PCT Filed: Jul. 31, 2002

(86) PCT No.: PCT/GB02/03495

§ 371 (c)(1),
(2), (4) Date: Jul. 12, 2004

(87) PCT Pub. No.: WO03/014969

PCT Pub. Date: Feb. 20, 2003

(65) Prior Publication Data

US 2004/0243628 A1    Dec. 2, 2004

(30) Foreign Application Priority Data

Aug. 10, 2001  (CA)  .................... 2354993

(51) Int. Cl.
*G06F 7/06* (2006.01)
*G06F 7/20* (2006.01)
*G06F 17/30* (2006.01)

(52) U.S. Cl. ........................ 707/3; 715/501.1

(58) Field of Classification Search ............ 715/501.1, 715/513; 709/218; 707/3
See application file for complete search history.

(56) References Cited

U.S. PATENT DOCUMENTS

| | | | |
|---|---|---|---|
| 4,896,859 A | 1/1990 | Polzer et al. ............... 248/549 |
| 5,165,750 A | 11/1992 | Pirhonen .................... 296/100 |
| 5,351,148 A | 9/1994 | Maeda et al. ............... 359/124 |
| 5,751,956 A | 5/1998 | Kirsch ................... 395/200.33 |
| 5,802,299 A | 9/1998 | Logan et al. ............... 709/218 |
| 5,870,546 A | 2/1999 | Kirsch ................... 395/200.33 |
| 5,924,104 A * | 7/1999 | Earl ......................... 715/501.1 |
| 5,930,154 A | 7/1999 | Thalhammer-Reyero .... 364/578 |
| 5,956,487 A | 9/1999 | Venkatraman et al. . 395/200.48 |
| 5,964,839 A | 10/1999 | Johnson et al. ............. 709/224 |
| 5,983,245 A | 11/1999 | Newman et al. ............ 715/513 |
| 5,987,482 A * | 11/1999 | Bates et al. ................. 715/513 |
| 5,999,929 A | 12/1999 | Goodman ....................... 707/7 |
| 6,012,067 A | 1/2000 | Sarkar ......................... 707/103 |
| 6,035,330 A * | 3/2000 | Astiz et al. .................. 709/218 |
| 6,069,630 A | 5/2000 | Lisle et al. .................. 345/357 |
| 6,081,900 A | 6/2000 | Subramaniam et al. ..... 713/201 |
| 6,308,678 B1 | 10/2001 | Haas et al. .............. 123/192.1 |
| 6,344,851 B1 * | 2/2002 | Roberts et al. ............. 345/418 |
| 6,358,575 B1 | 3/2002 | Spragg ..................... 428/34.1 |
| 6,464,019 B1 | 10/2002 | Werner et al. ............... 175/4.6 |
| 6,585,776 B1 * | 7/2003 | Bates et al. .............. 715/501.1 |
| 2003/0088643 A1 * | 5/2003 | Shupps et al. .............. 709/218 |

FOREIGN PATENT DOCUMENTS

| | | |
|---|---|---|
| EP | 0863453 A1 | 9/1998 |
| GB | 2327514 | 1/1999 |
| JP | 2000-029883 | 1/2000 |
| JP | 2000-090111 | 3/2000 |
| WO | WO96/38962 | 12/1996 |
| WO | WO98/21683 A2 | 5/1998 |
| WO | WO98/21683 A3 | 5/1998 |
| WO | WO99/54834 | 10/1999 |
| WO | WO00/26760 | 5/2000 |
| WO | 01/57718 | 8/2001 |

OTHER PUBLICATIONS

"Delivering Documents on the World Wide Web," *Software World*, 27(4): Jul. 8-12, 1996. (abstract).

"Publicly Accessible Web Pages with Restricted Direct Link Access," *IBM Technical Disclosure Bulletin*, 40(1): 179-180, Jan. 1997.

Aimar et al., "Weblinker, a Tool for Managing WWW Cross-References", *Computer Networks and ISDN Systems*, 28(1-2): 99-107, Dec. 1995. (abstract).

Kramer, M.I., "Open Market Transact," *E-Business Strategies & Solutions*, 19-32, Nov. 1999. (abstract).

Li et al., "PowerBookmarks: A System for Personalizable Web Information Organization, Sharing, and Management," *SIGMOD Record*, 28(2): 565-567, Jun. 1999. (abstract).

Tyler, T., "URLs, PURCs and TRULs: Link Maintenance in the Web-Accessible OPAC," *14th Annual Computers in Libraries '99. In cooperation with Special Libraries Association. Proceedings—1999*, 172-180, 1999. (abstract).

* cited by examiner

*Primary Examiner*—Sam Rimell
*Assistant Examiner*—Alicia Lewis
(74) *Attorney, Agent, or Firm*—Myers Bigel Sibley & Sajovec, PA

(57) ABSTRACT

The invention provides a method for indicating that a link on a web page is to an external link previously this was done by the webmaster. The current method carries this out by the client software comparing the domain name of the current document's URL with that of the link in question, and applying a visual indicator to the link if it is external.

9 Claims, 1 Drawing Sheet

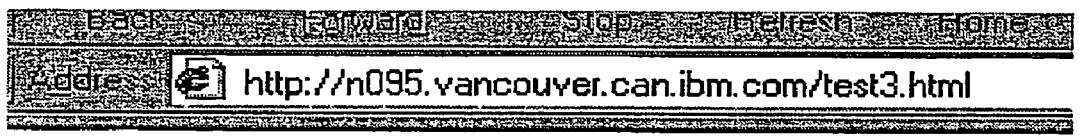
Test External Links
Fig. 1a
Local Link
Fig. 1b
external but within IBM
Fig. 1c
external and outside IBM 

METHOD SYSTEMS AND COMPUTER PROGRAM PRODUCTS FOR INDICATING LINKS TO EXTERNAL URLS

RELATED APPLICATIONS

The present application is a National Phase application of PCT/GB02/03495 filed on Jul. 31, 2002 and published in English, which claims priority from Canadian Application 2,354,993 filed on Aug. 10, 2001.

FIELD OF THE INVENTION

The invention relates to the field of World Wide Web communications and more particularly to a method for indicating that a link on a web page is to an external link.

BACKGROUND OF THE INVENTION

The World Wide Web is the distributed system of communication and information transfer over the Internet made possible by the widely supported hypertext transfer protocol (HTTP). Client side web browsers implement the client side of the HTTP protocol and utilize Uniform Resource Locators (URLs) to locate a specific resource on the World Wide Web. The syntax and semantics of URLs, the formalized information for location and access of resources on the Internet, is specified in RFC 1630, a document written by the URI working group of the Internet Engineering Task Force. at http://www.w3.org/Addressing/URL/Overview.html. The URL allows resource locations to be described by a simple string. URLs can point to resources on a local server or they can point to resources on an external server. In the following disclosure, an external link is a link whose URL has a domain name that differs from the URL used to retrieve the current document.

Web pages are written in HyperText Markup Language (HTML), the publishing language of the World Wide Web. The HTML 4.01 Specification, found at http://www.w3.org/TR/REC-html40/ defines the HyperText Markup Language (HTML). Web pages generally contain both internal links and external links. It is useful to indicate to the client that a link is an external link so the client will know that linking to that URL will require leaving the current server. In HTML pages, webmasters sometimes manually highlight external URLs by manually coding adornments such as images around links to external URLs as a visual warning to the user that they are leaving the current site. For example a common image used for this purpose is a small image of a globe to the right of the link. The image is presented as a visual clue to the user that the link leaves the current site. The webmasters also commonly have external links open in a new window. However it would be simpler to place the responsibility for providing such visual clues onto the client software, since the client software has enough information to determine this.

There is therefore a need for a method for using client software to provide a visual or other indication that a link on a web page is an external link.

U.S. Pat. No. 5,924,104 discloses a method and apparatus for displaying interdocument links in a computer system. A document is parsed to identify links. The identified links are parsed to identify interdocument links and the identified interdfocument links are displayed in a first presentation style. Other links are displayed in a second presentation style.

Patent Cooperation Treaty publication 0033213A consists of a system spidering a web document and summarizing the document structure and links in a new document. The system does not provide an indication in the original web document.

SUMMARY OF THE INVENTION

The present invention therefore provides a method of indicating that a link on a web document accessed by a client using web browser software is to an external link, wherein said web document has an associated document object model, the method comprising the steps of:

i) identifying all the links in said web document by querying the document object model associated with the web document;

ii) for each link, comparing the web document's URL domain name to the link's URL domain; and iii) if the web document's URL and the link's URL's domain names are different then providing an indication associated with the link that the link is external.

The invention further provides a computer program product and an article comprising a computer readable modulated carrier signal for carrying out the method.

BRIEF DESCRIPTION OF THE DRAWINGS

In drawings which disclose a preferred embodiment of the invention:

FIGS. 1a, 1b and 1c are illustrations of computer screen displays illustrating the different ways in which links on a web page can be displayed.

DETAILED DESCRIPTION OF EMBODIMENTS OF THE INVENTION

The present embodiment provides a software method that takes the responsibility off of the Webmaster to identify external links and provide adornments for them. At runtime there is enough information to determine if a link's URL is external and all that is required is software that will act upon the available data. This software is embodied in a script using a scripting language such as ECMAScript that is loadable and runnable by the browser at runtime. A description of ECMAScript is set out at http://www.ecma.ch/ecma1/stand/ecma-262.htm. There is a function in the said script that is registered with the HTML window's on Load event handler by inclusion of the script in the HTML document. When the document has been loaded the said function will be called by the browser to start the process. The process consists of the following macro steps.

1 Identify all the anchor links by querying the Document Object Model (DOM).

2. For each anchor link find out how similar the document URL is to the anchor link's URL. If they are different in domain then adorn the link according to the user-defined actions in the script.

Document Object Model (DOM) Level 1 Specification is found at http://www.w3.org/TR/2000/WD-DOM-Level-1-20000929/. This specification defines the Document Object Model, a platform-and language-neutral interface that allows programs and scripts to dynamically access and update the content, structure and style of documents. The Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability on the Web.

The types of visual indication or adornment which is used to indicate an external link are user defined according to the style of the web site. The same script containing the adornments may be shared across the whole web site. The adornment could be images placed in close proximity to the link, or the external link's properties could be modified, such as a change in its font or colour. A useful adornment would be to change the mouse cursor to a special icon when the cursor is hovering above an external link. For instance an icon depicting a hand superimposed with a global could be used for this purpose. Link properties could also be automatically set so that the link would be displayed in a new browser window upon activation of the link.

Auditory or tactile indications of an external link may also be used. For example, when the mouse cursor passes over the external link, a distinctive audible sound might be generated. Or when the mouse cursor passes over an external link, the mouse may be caused to vibrate.

Normally this method will be applied by comparing only the two domain names in the two URLs, i.e. zzz.yyy where yyy is the generic Top level domains such as .com, .org or .net, or a two letter country code, and xxx is the unique company or individual's name. For some country codes a third section of the domain is also included such as a .co, .com, .bc or the like as in the case of zzz.co.uk, or zzz.bc.ca. Such additional sections of the domain name are encompassed herein in the term "domain name". The comparison algorithm must be able to identify such strings to extend the comparison to all three or more sections of the domain name in such cases Adornments may be applied differently for external links depending on the severity of the deviation from the current URL. Links within the same company can have one set of adornments while non-company links can have another. For example, as shown in FIG. 1a, a local link, having the same domain as the accessed document, say vancouver.can.ibm.com, is shown in a standard colour (say blue), whereas, as shown in FIG. 1b, a link which is within the same company domain but external to the accessed document and in a different sub-domain, say toronto.can.ibm.com is shown in a different colour, say red. Further, as shown in FIG. 1c, an external link, say msn.com, is shown in association with an icon. Thus the invention can provide two or more levels of indicators to show varying degrees of similarity of the link to the URL of the accessed document.

When adorning links with images special care must be taken that the adornment is not added when the item that is being linked is already an image. Adding such an adornment could result in an unusual effect as images are often juxtaposed and adding an additional image would result in disturbing the collage. Adorning links with images should only occur for linked inline text. Such checks can be done programically by analyzing the child nodes of the link.

The above method accepts a DOM and returns an altered DOM consisting of adornments to external links. A variation of this can exist where the HTML document is pre-processed at design time rather than the DOM at runtime. The pre-processor would need to have the desired home domain of the document supplied to it, as this would not be available otherwise. Otherwise the process is the same except for modifying the HTML instead of the DOM.

The following is an example of HTML and its rendering in Internet Explorer 5.5 is shown in FIG. 1. In FIG. 1b the script has changed the external link's colour from blue to red and in FIG. 1c the link outside of IBM has an icon added dynamically.

```
<HTML>
 <HEAD>
  <SCRIPT arc="URL.js" language="javascript"></SCRIPT>
 </HEAD>
 <BODY>
 <H1>Method of Linking to External URLs</H1>
 <A href="http://n095.vancouver.can.ibm.com/test2.html"><img
src="erdo-logo.jpg">Local Link</A>
 <BR>
 <A href="http://w3.ibm.com"><img src="erdo-logo.jpg">external but
within IBM</A>
 <BR>
 <A href="http://www.yahoo.com"><img src="erdo-logo.jpg">external
and outside IBM</A>
 </BODY>
</HTML>
```

The following pseudo-code illustrates a preferred embodiment of the method of programming the invention.

Pseudo Code

```
window.onload=init; /* register with event handler */
function init( ) {
   for all link in document
      simularity = howSimilar(getDomainOfLink(link.href) ,
                              document.domain) ;
      if (simularity != SAME) {
        adornLink(link, simularity) ;
      }
   }
}
function adornLink(link, simularity) {/* sample. user defined */
   if (simularity == SAME_COMPANY) {
      link.style.cursor = "crosshair";
      link.style.color = "red";
      link.style.fontWeight = "bold";
   } else {
      link.style.cursor = "crosshair";
      link.style.color = "green";
      link.style.fontWeight = "bold";
      link.target = "_blank";
      if (linkEndsWithText(link) ) {
        /* add an image */
        img = document.createElement("IMG") ;
        img.border = 0;
        img.src = "leave-ms.gif";
        img.alt = "Leave MSN";
        link.insertBefore(img, null) ;
      }
   }
}
```

The present invention is described above as a computer-implemented method. It may also be embodied as a computer hardware apparatus, computer software code or a combination of same. The invention may also be embodied as a computer-readable storage medium embodying code for implementing the invention. Such storage medium may be magnetic or optical, hard or floppy disk, CD-ROM, firmware or other storage media. The invention may also be embodied on a computer readable modulated carrier signal.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method of indicating that a link on a web document accessed by a client using web browser software is to an external link, wherein said web document has an associated document object model, the method comprising:
   identifying links in said web document by querying said document object model associated with said web document;
   comparing a URL domain name of said web document to a URL domain name of an identified link;
   providing an indication associated with at least one identified link that said at least one identified link is external when the URL domain name of said web document is different from the URL domain name of said at least one identified link;
   for each identified link, comparing a URL sub-domain of said web document to a URL sub-domain of said identified link; and
   providing an indication associated with at least one identified link that said at least one identified link is internal but in a different sub-domain when the URL sub-domain of the web document is different from the URL sub-domain of said at least one identified link and the URL domain of the web document is the same as the URL domain of said at least one identified link.

2. The method of claim 1 wherein said indication comprises one or more of the following:
   a change in a mouse cursor when the mouse cursor passes over the at least one identified link;
   an audible indication when the mouse cursor passes over the at least one identified link;
   a tactile indication when the mouse cursor passes over the at least one identified link; and
   a vibration when the mouse cursor passes over the at least one identified link.

3. A computer program product for indicating that a link on a web document accessed by a client using web browser software is to an external link, wherein said web document has an associated document object model, said computer program product comprising:
   a computer usable medium having computer readable program code means embodied in said medium for: identifying links in said web document by querying said document object model associated with said document; for each identified link, comparing a URL domain of the web document to a URL domain of each identified link; if a URL domain name of the web document is different from a URL domain of at least one identified link, providing an indication associated with said at least one identified link that the at least one identified link is external; for each identified link, comparing a URL sub-domain of said web document to a URL sub-domain of said identified link; and providing an indication associated with at least one identified link that said at least one identified link is internal but in a different sub-domain when the URL sub-domain of the web document is different from the URL sub-domain of said at least one identified link and the URL domain of the web document is the same as the URL domain of said at least one identified link.

4. The computer program product of claim 3 wherein said indication comprises one or more of the following:
   a change in a mouse cursor when the mouse cursor passes over the least one identified link;
   is an audible indication when the mouse cursor passes over the least one identified link;
   a tactile indication when the mouse cursor passes over the least one identified link; and
   a vibration when the mouse cursor passes over the least one identified link.

5. An article comprising:
   a computer readable modulated carrier signal;
   means embedded in said signal for indicating that a link on a web document accessed by a client using web browser software is to an external link; wherein said web document has an associated document object model, said means comprising means for identifying links in said web document by querying said document object model associated with said web document; for each identified link, comparing a URL domain of the web document to a URL domain of each identified link; if a URL domain of the web document is different from a URL domain of at least one identified link, providing an indication associated with said at least one identified link that the at least one identified link is external; for each identified link, comparing a URL sub-domain of said web document to a URL sub-domain of said identified link; and providing an indication associated with at least one identified link that said at least one identified link is internal but in a different sub-domain when the URL sub-domain of the web document is different from the URL sub-domain of said at least one identified link and the URL domain of the web document is the same as the URL domain of said at least one identified link.

6. The article of claim 5 wherein said indication comprises one or more of the following:
   a change in a mouse cursor when the mouse cursor passes over the at least one identified link;
   an audible indication when the mouse cursor passes over the at least one identified link;
   a tactile indication when the mouse cursor passes over the at least one identified link; and
   a vibration when the mouse cursor passes over the at least one identified link.

7. The method of claim 1 wherein identifying links comprises identifying all links in the web document.

8. The computer program product of claim 3 wherein the code means for identifying links comprises code means for identifying all links in the web document.

9. The article of claim 5 wherein the means for identifying links comprises means for identifying all links in the web document.

* * * * *

UNITED STATES PATENT AND TRADEMARK OFFICE
CERTIFICATE OF CORRECTION

PATENT NO.       : 7,136,849 B1                                       Page 1 of 1
APPLICATION NO.  : 10/487971
DATED            : November 14, 2006
INVENTOR(S)      : Patrick It is certified that error appears in the above-identified patent and that said Letters Patent is hereby corrected as shown below:

On the Title Page,
ITEM (54) TITLE, Line 1 should read --METHODS, SYSTEMS AND COMPUTER --

Column 1,
Line 1 should read -- METHODS, SYSTEMS AND COMPUTER --

Signed and Sealed this

Sixteenth Day of October, 2007

JON W. DUDAS
*Director of the United States Patent and Trademark Office*